IMAGE-REPRODUCING SYSTEM FOR COLOR-TELEVISION RECEIVER

Filed July 16, 1953 2 Sheets-Sheet 1

IMAGE-REPRODUCING SYSTEM FOR COLOR-TELEVISION RECEIVER

Filed July 16, 1953 2 Sheets-Sheet 2

United States Patent Office 2,722,563

Patented Nov. 1, 1955

2,722,563

IMAGE-REPRODUCING SYSTEM FOR COLOR-TELEVISION RECEIVER

Bernard D. Loughlin, Lynbrook, N. Y., assignor to Hazeltine Research, Inc., Chicago, Ill., a corporation of Illinois Application July 16, 1953, Serial No. 368,385

12 Claims. (Cl. 178—5.4)

*General*

The present invention is directed to image-reproducing systems for color-television receivers and, particularly, to such reproducing systems in a compatible color-television receiver for reproducing either color or monochrome images.

In a form of color-television system more completely described in an article in "Electronics" for February 1952 entitled "Principles of NTSC compatible color television" at pages 88–95, inclusive, information representative of a scene in color being televised is utilized to develop at the transmitter two substantially simultaneous signals one of which is primarily representative of the brightness or luminance and the other of which is representative of the chromaticity of the image. These signals are combined to form a composite video-frequency signal in a manner more fully described in such article and the composite signal is utilized to modulate a conventional radio-frequency carrier-wave signal. A receiver in such system intercepts the radio-frequency signal and derives the composite video-frequency signal therefrom. The receiver includes a pair of channels for applying the brightness and chrominance information to an image-reproducing device therein. The channel for translating the brightness signal is substantially the same as the video-frequency amplifier portion of a conventional monochrome receiver. The chrominance signal is translated through the second of such channels and three color-signal components individually representative of the three primary colors red, green, and blue of the image are derived therefrom and are combined with the brightness signal in the image-reproducing device to effect reproduction of the televised image.

One form of image-reproducing device in such receiver includes a cathode-ray tube having three electron guns, the three color-signal components being individually applied to different ones of the guns while the brightness signal is applied to each of the guns. The electron beams emitted from the three guns are utilized individually to excite different ones of three phosphors which effectively develop three primary color images, such images being optically combined to reproduce the televised image. When the color-television receiver is being utilized for its primary purpose, that is to reproduce color images, the combined primary color images reproduce such color images. However, such receiver is a compatible receiver in that it is capable of reproducing not only the aforementioned color images but also conventional black-and-white images if conventional monochrome signals are received and applied to the cathode-ray tube. In order to reproduce such black-and-white images, the beams emitted by the three electron guns should be so controlled in relative intensities that the three primary color images developed by such beams have relative brightnesses which combine throughout the brightness range of the monochrome image to reproduce the monochrome image. Similar relative intensities of the beams should also be developed to reproduce a correct color image with proper proportions of the primary colors when color signals are being utilized. In known color-television receivers, the preliminary adjustment of the biasing potentials on the electrodes of such guns to effect such results is more difficult than is desirable.

In order to control an image-reproducing device such as described above to reproduce monochrome images when monochrome signals are being utilized, initially the biasing potentials on the control electrodes or first grids in each of the electron guns are adjusted relative to each other so that when a signal representative of a dark shade of gray is applied to each thereof the color images developed by the electron beams emitted from such guns combine to represent such dark shade of gray. This adjustment establishes what is conventionally designated as the "black level" for the three guns and determines the proper biases for the black extremity of the brightness range of the image-reproducing device. In order to assure monochrome reproduction, the proper relative beam currents for reproducing another illumination in the brightness range, preferably near white, should also be developed. In a receiver in which the relative ranges of the color-difference and brightness signals are maintained substantially constant, such brighter illumination is effected by applying a signal representative of white simultaneously to the three electron guns and by developing proper relative biasing potentials on other electrodes in the guns, specifically, on the screen electrodes so that the three color lights developed by the three electron beams combine to reproduce white. However, it can readily be understood that such adjustment of the biasing potentials on the screen electrodes to effect reproduction of white will, because of the dual effect on the electron beam in each electron gun of the biasing potentials on the first electrode and the screen electrode, disturb the initially established black level. In other words, when a signal representative of a dark shade of gray is applied to the tube after the potentials on the screen electrodes have been adjusted as just described, the potentials on the first electrodes will no longer be in proper proportion to cause such dark shade of gray to be reproduced. Consequently, the potentials on the first set of electrodes will require readjustment and such readjustment may require a further adjustment of the potentials on the screen electrodes. An undesirably large number of such adjustments and readjustments may be required before a satisfactory compromise adjustment for the biasing potentials on both electrodes is determined. This uncertainty in the adjustment of the potentials on the screen and control electrodes to develop monochrome images is undesirable.

It is, therefore, an object of the present invention to provide a new and improved image-reproducing system for a color-television receiver for reproducing either color or monochrome images which does not have the disadvantages of prior such systems.

It is also an object of the invention to provide a new and improved image-reproducing system for a color-television receiver for reproducing either color or monochrome images in which the adjustment of the biasing potentials on the electrodes in a cathode-ray picture tube in such system to reproduce such monochrome images may be made simply and quickly.

It is a further object of the present invention to provide a new and improved image-reproducing system for a color-television receiver for reproducing either color or monochrome images in which the adjustment of the biasing potentials on one set of electrodes in a cathode-ray picture tube in such system to reproduce such monochrome images simultaneously adjusts the biasing potentials on another set of electrodes in such tube to compensate for the effect of the adjustment of the initial potential on the first set of electrodes.

In accordance with the present invention, an image-reproducing system for a color-television receiver for reproducing either color or monochrome images having a range of brightnesses comprises an input circuit for supplying a monochrome signal to such system. The image-reproducing system further includes a color image-reproducing apparatus including a plurality of electron guns each having at least two pairs of electrodes with an electrode common thereto, a first of the pairs in each of the guns being responsive to the monochrome signal for controlling the apparatus to develop and combine different color images to reproduce the monochrome images. The image-reproducing system also includes biasing means comprising a first biasing circuit including a first impedance element coupled to one of the first pairs of electrodes in one of the guns for applying a biasing potential thereto. The biasing means further comprises a second biasing circuit including a second impedance element coupled to one of the second pair of electrodes in the one gun for applying a biasing potential thereto. The aforementioned biasing potentials are so proportioned as to control the apparatus to reproduce a predetermined brightness level in the vicinity of one extremity of the brightness range when the monochrome signal represents such level. Finally, the image-reproducing system comprises an adjustable impedance means coupled between the uncommon ones of the electrodes in the one gun for controlling the current in the aforesaid impedance elements to adjust the biasing potential on one of the uncommon electrodes to control the apparatus to reproduce a second brightness level in the vicinity of the other extremity of the brightness range when the monochrome signal represents the other level and simultaneously to adjust the bias potential of the other of the uncommon electrodes to compensate for the effect thereon of the adjustment of the potential on the one electrode.

For a better understanding of the present invention, together with other and further objects thereof, reference is had to the following description taken in connection with the accompanying drawings, and its scope will be pointed out in the appended claims.

Referring to the drawings.

Figure 1:
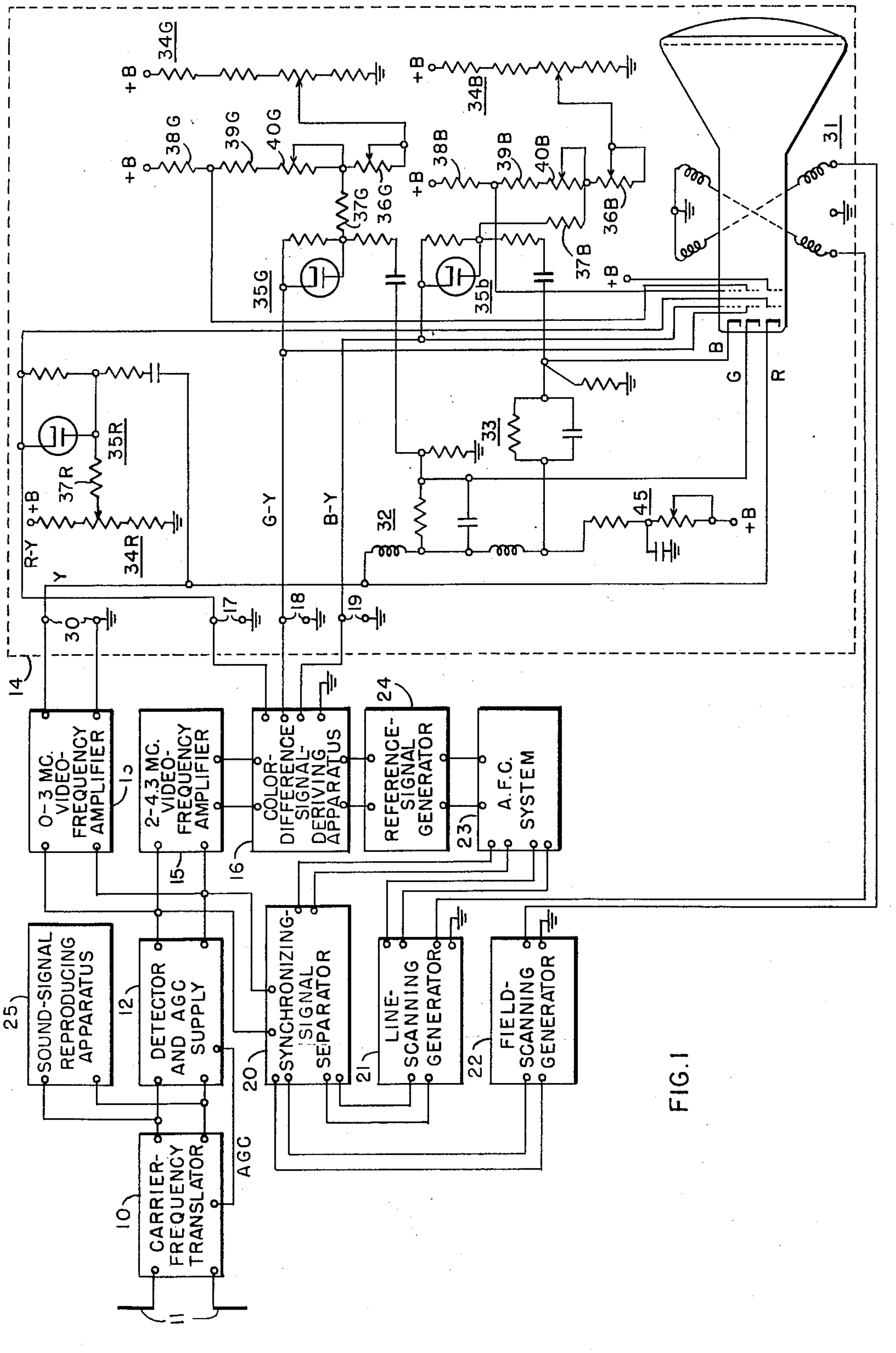
Fig. 1 is a circuit diagram, partially schematic, of a color-television receiver including an image-reproducing system in accordance with the present invention.

*General description of receiver of Fig. 1*

Referring now to Fig. 1 of the drawings, there is represented a color-television receiver of the superheterodyne type such as may be used in a color-television system of the type previously discussed herein and in the aforesaid "Electronics" article. The receiver includes a carrier-frequency translator 10 having an input circuit coupled to an antenna system 11, 11. It should be understood that the unit 10 may include in a conventional manner one or more stages of wave-signal amplification, an oscillator-modulator, and one or more stages of intermediate-frequency amplification if such are desired. Coupled in cascade with the output circuit of unit 10, in the order named, are a detector and automatic-gain control (AGC) supply 12, a video-frequency amplifier 13 having a pass band preferably of 0–3 megacycles, and an image-reproducing system 14 in accordance with the present invention, to be described more fully hereinafter, and including a picture tube having three electron guns. The unit 13 is an amplifier for the brightness or monochrome component of the composite video-frequency signal and the pass band thereof has an upper frequency limit of approximately 3 megacycles to prevent translation of a chromaticity signal of approximately 3.58 megacycles therethrough.

An output circuit of the detector 12 is coupled through a video-frequency amplifier 15, preferably having a pass band of 2–4.3 megacycles, and a color-difference signal-deriving apparatus 16 to a plurality of input circuits having pairs of input terminals 17, 17, 18, 18, and 19, 19 in the image-reproducing system 14. The unit 15 is an amplifier for the chrominance or color portion of the composite video-frequency signal. The color-difference signal-deriving apparatus 16 may be of a type more fully described in the aforementioned "Electronics" article. Briefly, when, as in the color-television system described in the aforementioned "Electronics" article, the color information is transmitted as modulation components at different phase points of a subcarrier wave signal, then the apparatus 16 comprises a plurality of devices equal in number to the number of the modulation components to be derived from the different phase points of the subcarrier wave signal. In each of such devices the subcarrier wave signal and a locally generated signal of a phase corresponding to that of the phase point on the wave signal from which the modulation component is to be derived are heterodyned to derive such component. Additionally, such apparatus may include a simple resistor-type matrixing system for combining predetermined relative proportions of the derived components to develop desired color-difference signals $R-Y$, $G-Y$, and $B-Y$ representing, respectively, the red, green, and blue of an image. However, for the purposes of the present invention the apparatus 16 need not be limited to the type apparatus just described and could be, for example, a simple system of networks for deriving three signals representative of the three primary colors of the image, the nature of the deriving apparatus being determined by the manner in which such signals are encoded and any of a number of conventional coding systems and decoders might be employed.

An output circuit of the detector 12 is also coupled through a synchronizing-signal separator 20 to a line-scanning generator 21 and a field-scanning generator 22, output circuits of the latter units being coupled, respectively, to line-deflection and field-deflection windings of the image-reproducing system 14. Additionally, an output circuit of the separator 20 and of the generator 21 are coupled through an automatic-frequency-control system 23 to a reference-signal generator 24, the output circuit of which is coupled to the deriving apparatus 16. The AFC system 23 may be of a conventional type for utilizing synchronizing signals from unit 20 to control the frequency and phase of the signal developed by the generator 24. The generator 24 may be a conventional sine-wave generator for developing the signal to be heterodyned with the subcarrier wave signal in the unit 16 in the manner previously described herein. For example, the unit 24 may develop a signal having a frequency of approximately 3.58 megacycles and the phasing of such signal with respect to such subcarrier wave signal is critically maintained so that such signals may be heterodyned in the apparatus 16 to derive the modulation components at the different phase points of the subcarrier wave signal as previously described.

The AGC supply of the unit 12 is connected through the conductor identified as AGC to input terminals of one or more of the stages in the unit 10 to control the gains of such stages to maintain the signal input to the detector 12 within a relatively narrow range for a wide range of received signal intensities. A sound-signal reproducing apparatus 25 is also connected to an output circuit of the unit 10 and it may include stages of intermediate-frequency amplification, a sound-signal detector, stages of audio-frequency amplification, and a sound-reproducing device.

It will be understood that the various units and circuit elements thus far described, with the exception of the image-reproducing system 14, may be of conventional construction and design, the details of such units being well known in the art and requiring no further description.

*General operation of receiver of Fig. 1*

Considering briefly now the operation of the receiver of Fig. 1 as a whole and assuming the image-reproducing system 14 to be of a conventional type, a desired composite television signal is intercepted by the antenna system 11, 11, is selected, amplified, and converted to an intermediate frequency, and further amplified in the unit 10 and the video-frequency modulation components thereof are derived in the detector 12 to develop a composite video-frequency signal. The latter signal comprises synchronizing components, the aforementioned subcarrier wave signal or chromaticity signal, and a luminance or brightness signal Y. The luminance or brightness signal is further amplified in the unit 13 and applied to the image-reproducing system 14 wherein it is utilized in a manner to be explained more fully hereinafter.

The synchronizing components including line-frequency and field-frequency synchronizing signals as well as a color burst signal for synchronizing the operation of the deriving apparatus 16 are separated from the other video-frequency components and at least some of such synchronizing signals are separated from each other in the synchronizing-signal separator 20. The line-frequency and field-frequency synchronizing components are applied, respectively, to the units 21 and 22 to synchronize the operation thereof with the operation of related units at the transmitter. These generators supply signals of saw-tooth wave form which are properly synchronized with respect to the transmitted signal and are applied to the line-deflection and field-deflection windings in the system 14 to effect a rectilinear scanning of the image screen of the picture tube in the system 14. The color burst signal, which is substantially a few cycles of an unmodulated portion of the aforementioned subcarrier wave signal and which has a desired reference phase with respect to such subcarrier wave signal, is applied to the automatic-frequency-control system 23 during the line retrace period, as controlled by a gating signal developed in an output circuit of the generator 21, to control the frequency and phase of the signal developed in the generator 24. The signal developed in the generator 24 is applied to the deriving apparatus 16.

The modulated subcarrier wave signal or chromaticity signal is amplified in the unit 15 and also applied to the deriving apparatus 16. As explained more fully in the aforementioned article in "Electronics," the signal developed by the generator 24 and the subcarrier wave signal are heterodyned in the apparatus 16 to derive modulation components at predetermined phase points of the subcarrier wave signal. In the manner described in the aforementioned article, these derived modulation components are then combined in the proper proportions and senses in a matrixing system to develop color-difference signals $R-Y$, $G-Y$, and $B-Y$ representative, respectively, of the red, green, and blue of a televised color image. In the unit 14 the brightness signal applied thereto from the amplifier 13 and the color-difference signals $R-Y$, $G-Y$, and $B-Y$ are combined to control the intensities of electron beams in the picture tube in the system 14. This intensity modulation of the electron beams and the geometry of the apertured mask of the picture tube result in the excitation of different color phosphors the light from which is optically combined to reproduce the color image.

The automatic-gain-control or AGC signal developed in the unit 12 is effective to control the amplification of one or more of the stages in the unit 10 thereby to maintain the signal input to the detector 12 and to the sound-signal reproducing apparatus 25 within a relatively narrow range for a wide range of received signal intensities. The sound-signal modulated wave signal having been selected and amplified in the unit 10 is applied to the apparatus 25. Therein it is amplified and detected to derive the sound-signal modulation components which may be further amplified and then reproduced in the reproducing device of the unit 25.

The above explanation has been presented on the assumption that the signal intercepted by the antenna system 11, 11 is a color-television signal. If, however, the intercepted signal is a conventional monochrome television signal, then a conventional video-frequency signal is derived by the detector 12 and translated through the amplifier 13 and applied to the image-reproducing system 14. At such time, since there is no modulated subcarrier signal representative of color, no color signals are translated through the amplifier 15 and, therefore, no signal derivation of color-difference signals occurs in the apparatus 16. The monochrome signal applied to the unit 14, as will be explained more fully hereinafter, causes the different electron beams in the picture tube in the unit 14 to excite the different color phosphors in such manner that the illuminations therefrom are in proper relative proportions to combine to reproduce a monochrome image having a full range of brightnesses.

*Description of image-reproducing system of Fig. 1*

The image-reproducing system 14 of Fig. 1 comprises an input circuit for supplying a monochrome signal, specifically, comprises the circuit coupled through a pair of terminals 30, 30 to the output circuit of the amplifier 13 and directly coupled to one cathode in a cathode-ray color image-reproducing device 31 and individually through networks 32 and 33, respectively, to different ones of another pair of cathodes in the device 31. The inductors in the networks 32 and 33 are proportioned with respect to the inherent capacitances in the cathode circuits to cause these circuits to have substantially uniform response over the 3 megacycle range of the brightness signal. The resistor-condenser portions of such networks comprise voltage-divider circuits for applying such relative magnitudes of the brightness signal to the different cathode circuits as will combine to effect reproduction of a black-and-white image in the picture tube. For example, in the embodiment being described these voltage-divider circuits are proportioned to develop brightness signals, for application to the cathodes which control the green and blue images, which have magnitudes of approximately 0.8 that applied to the cathode for controlling the red image. Such relative magnitudes are determined by the relative efficiencies of the different electron-gun circuits in reproducing the different color images and, more specifically, by the response efficiencies of the different phosphors. A source of cathode biasing potential and a common load circuit for the three cathodes, specifically, a voltage-divider network 45 is coupled between the network 33 and a source of +B potential.

The image-reproducing system also comprises a color image-reproducing apparatus, specifically, the device 31 including a plurality of electron-discharge devices, specifically, electron guns each having two pairs of electrodes with an electrode common thereto. Such a tube is more fully described in an article entitled "General description of receivers for the dot-sequential color television system which employ direct-view tri-color kinescopes" in the RCA Review for June 1950 at pages 228–232, inclusive. More specifically, each of the electron guns in such tube comprises a cathode, a control electrode adjacent the cathode, and a screen electrode, the control electrode and cathode forming one pair and the screen electrode and cathode forming a second pair with the cathode being the electrode common thereto. There are three such pairs of electrodes comprising three electron guns individually responsive to different ones of the primary colors, for example, to such primary colors as red, green, and blue. At least one of the first pair of electrodes in each of the above-mentioned electron guns, for example, the cathode, is responsive to the monochrome signal for controlling the apparatus 31 to develop and combine different color images to reproduce the monochrome images. The device 31 may, for example, comprise a single cathode-ray tube having the above-mentioned plurality of electrodes. The guns in such a tube are aimed through holes in an apertured screen at elemental areas of different phosphors for developing the different primary colors. It should be understood that other suitable types of color-television image-reproducing devices having a plurality of electron guns may be employed.

Since the circuits for developing the signals representative of the different primary colors and for applying such signals to different ones of the electron guns have many similar circuit elements, hereinafter such elements in such circuits will be designated by the same reference numerals with the suffixes R, G, or B indicating that such elements are in, respectively, the channels for translating the red, green, and blue signals. Also, hereinafter the different electron guns and circuits for translating the color signals will be referred to by employing the color as an adjective. For example, the green gun or green circuit will be utilized to refer to the gun which controls the reproduction of the green image and the circuit which translates the signal representative of green.

The image-reproducing system also comprises biasing means for controlling the magnitude of the biasing potentials applied to the control electrodes and screen electrodes in each of the guns in the device 31. Since such biasing means includes similar circuit elements for at least two of the electron guns and may include such elements for all of such guns, it will be described specifically with reference to one of such guns, that is, for the green gun. The differences between the circuits for developing the biasing potentials for the green gun and those for developing the biasing potentials for the blue and red guns will then be described.

The aforementioned biasing means comprises a first biasing circuit including a first impedance element coupled to one of the first pairs of electrodes in one of the guns for applying a biasing potential thereto. More specifically, considering the green gun, for a unidirectional biasing potential the control electrode or first grid of such gun is coupled through a series circuit of a conventional direct-current restorer network 35G, a fixed resistor 37G, and an adjustable resistor 36G to an adjustable tap on a voltage divider 34G which is coupled across a source of potential +B. The restorer network 35G is coupled for video-frequency signals between the aforesaid green control electrode and the ungrounded one of the pair of terminals 30, 30 through the network 32. The units or circuit elements 34G, 35G, 36G, and 37G comprise the aforementioned first biasing circuit and the adjustable resistor 36G comprises the first impedance element in such biasing circuit. The first biasing circuit for the blue gun comprises a similar group of circuit elements identified by the same reference numerals with suffixes of B. The first biasing circuit coupled to the control electrode of the red gun is not quite as complex as described with reference to the green gun for reasons which will be explained more fully hereinafter. However, those elements in such circuit similar to the elements in the biasing circuit for the green gun are identified by the same reference numerals with the suffix of the letter R. More specifically, the biasing circuit for the red gun does not include an element corresponding to the resistor 36G.

The biasing means also comprises a second biasing circuit including a second impedance element coupled to one of the second pair of electrodes in the one electron gun for applying a biasing potential thereto. More specifically, again considering the green gun, such second biasing circuit comprises the source of potential +B coupled through a second impedance element, specifically, a resistor 38G to the screen electrode of the green gun. The second biasing circuit for the blue gun is similar to that for the green gun, and the circuit for the red gun, for reasons to be explained more fully hereinafter, may not include an element corresponding to the resistor 38G and the screen electrode may be directly connected to the +B potential.

In a conventional manner, as will be more fully explained hereinafter, the biasing potentials applied to the screen and control electrodes of the different guns are so proportioned as to control the device 31 to reproduce a predetermined brightness level in the vicinity of one extremity of the brightness range, specifically, to reproduce substantially black when the monochrome signal applied to the cathodes of the device 31 represents such brightness level or black. The magnitude of a second impedance element such as the resistor 38G is substantially $\mu$ times that of a first impedance element such as the resistor 36G where $\mu$ has a conventional meaning, that is, it is equal to the ratio of the increments in the potentials on the two pairs of electrodes in the one gun, in other words, on the screen electrode and control electrode to cause equal increments in the current from the one gun for low anode currents representative of a dark shade of gray. It is well known that such $\mu$ is not constant over the range of anode current, in other words, over the brightness range, and thus the relative magnitudes of the two impedances can be made equal to $\mu$ only for one value thereof, for example, for anode currents near cutoff. A first impedance element, for example, the resistor 36G is adjustable to facilitate obtaining such ratio of $\mu$ between the two impedances.

The image-reproducing system also comprises an adjustable impedance means coupled between the uncommon ones of the electrodes in the one gun for controlling the current in the impedance elements described above to adjust the biasing potential on one of the uncommon electrodes. More specifically, considering again the green gun, such impedance means comprises a resistor 39G and an adjustable resistor 40G connected in series between the screen electrode of the gun and the junction of the resistors 36G and 37G, the latter resistors being coupled to the control electrode of the same gun. The circuits coupled to the blue gun include a corresponding pair of circuit elements similarly connected in such circuits. For reasons to be explained more fully hereinafter, such circuit elements may not be included in the circuits coupled to the red gun. The resistors 39G and 40G are coupled between the screen and control electrodes of the green gun to control the biasing potential on the screen electrode thereof to cause the device 31 to reproduce a second brightness level in the vicinity of the other extremity of the brightness range, specifically, to reproduce white when the monochrome signal represents the other level or white. The element 40G also simultaneously adjusts the biasing potential on the control electrode of the green gun to compensate for the effect thereon of the adjustment of the potential on the screen electrode of such gun. In a similar manner, the elements 39B and 40B are coupled to the screen and control electrodes of the blue gun and the resistor 40B performs a function similar to that described with reference to the resistor 40G.

Figure 2:
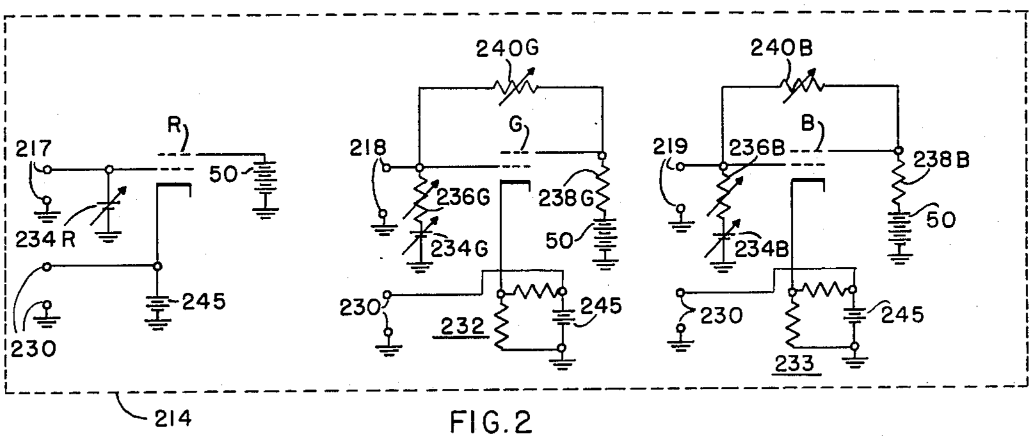
Fig. 2 is a simplified circuit diagram of a portion of the image-reproducing system of Fig. 1, and Figs. 3*a* and 3*b* are graphs useful in explaining the operation of the image-reproducing system of Fig. 1.

Fig. 2 represents a simplified circuit diagram of a portion of the image-reproducing system 14 of Fig. 1 including in simplified form only a few of the more important circuit elements represented in the system 14 of Fig. 1. Circuit elements corresponding to circuit elements in the system 14 of Fig. 1 are indicated by the same reference numerals with a factor of 200 added thereto and the red, green, and blue electron guns are indicated, respectively, by the symbols R, G, and B.

*Operation of image-reproducing system of Fig. 1*

Before considering in detail the manner in which the biasing potentials are developed and applied to the control electrodes and screen electrodes of the three electron guns in the device 31, the manner in which the system 14 operates to reproduce black-and-white the color images will briefly be explained. For the purposes of such explanation, it will be assumed that proper biasing potentials have been developed and applied to the aforementioned electrodes.

The brightness signal Y developed in the output circuit of the amplifier 13 is applied through the pair of terminals 30, 30 directly to the red cathode and through the networks 32 and 33, respectively, to the green and blue cathodes in the image-reproducing device 31. The color-difference signal $R-Y$ representative of the red of an image is applied through the pair of terminals 17, 17 to the control electrode in the red electron gun. The voltage divider 34R and the direct-current restorer 35R are utilized in a conventional manner to develop the proper block reference level for such control electrode for the red color signal R. The application of the color-difference signal $R-Y$ to the cathode of the direct-current restorer diode and of the brightness signal Y through the condenser to the anode of the diode effect restoration with respect to the color signal R, that is, with respect to the composite signal $R-LY+Y$. Similarly, the color-difference signals $G-Y$ representative of green and $B-Y$ representative of blue are applied through the pairs of terminals 18, 18 and 19, 19, respectively, individually to the control electrodes in the green and blue electron guns, respectively. As explained with reference to the application of the $R-Y$ signal to the control electrode of the red gun, the voltage dividers 34G and 34B and the direct-current restorers 35G and 35B are utilized to establish the proper black levels for the control electrodes of the corresponding electron guns. As explained more fully in the aforementioned article in "Electronics," the luminance or brightness signal applied to each of the cathodes in the device 31 and each of the color-difference signals $R-Y$, $G-Y$, and $B-Y$ applied, respectively, to the control electrodes in the red, green, and blue guns of the device 31 combine therein to develop color signals R, G, and B which individually control the intensities of the beams emitted from the different guns. This intensity modulation of the electron beams together with the paths of such beams from the different cathodes to the different phosphors results in an excitation of the different color phosphors on the image screen of the device 31. Such excitation in combination with the rectilinear scanning of such screen in the conventional manner is effective to cause a plurality of color images to be developed on the screen. If color-difference signals are derived and applied to the different electron guns in the manner just explained, these color images optically combine to reproduce a color image. However, if color-difference signals are not derived and only the brightness signal is applied to the different cathodes of the device 31, these images combine to reproduce a monochrome image of the conventional black-and-white type. As previously explained, in order to assure the proper reproduction of color and black-and-white images, the biasing potentials on the electrodes in the different electron guns should have definite relative magnitudes. If the biasing potentials do not have the proper relative magnitudes, the primary color images will not combine with the proper relative illuminations over the complete brightness range to reproduce black-and-white or proper composite color images and will tend to distort the color of the composite color image or to add color to the black-and-white image. The manner in which these biasing potentials are adjusted in accordance with the present invention to have such relative magnitudes will now be explained more fully with reference to the simplified diagram of Fig. 2.

The electrical and optical problems resulting from the utilization of a plurality of electron guns, for example, the three guns in the device 31 of Fig. 1 with the accompanying plurality of phosphors to reproduce a plurality of images which are optically combined to provide a resultant image in either color or black-and-white are similar to those present when utilizing three separate cathode-ray tubes, each developing a different color image. In order to obtain the maximum brightness range from the different tubes, initially, in a conventional manner, biasing potentials of approximately the proper magnitudes are applied to the many electrodes in such cathode-ray tubes. For example, considering the green gun G in Fig. 2, a potential source such as represented by the battery 234G is coupled to the control electrode of such tube for applying, for example, a range of positive potentials between 25 and 130 volts to such control electrode. The sourse of potential +B represented by the battery 50 is coupled to the screen electrode for applying, for example, approximately 375 volts thereto, and a fraction of the potential represented by the battery 245 is applied to the cathode, for example, approximately 165 volts is applied thereto. In addition, the conventional accelerating potentials and anode potentials would be applied to other electrodes (not shown) of the tube. The potentials on the aforementioned electrodes will cause the image reproduced in such tube to have a full range of brightnesses within the capabilities of the tube when a signal of a predetermined range of potentials is applied to the green cathode of the tube. The guns R and B have similar biasing potentials applied to the corresponding electrodes thereof. If only one picture tube is employed, as in a conventional monochrome receiver, the application of such biasing potentials with minor, noncritical adjustments thereof is all that is required to energize the tube to condition it to reproduce an image. However, when, for example, three such tubes are employed, though the absolute magnitudes of the potentials applied to the electrodes of the different tubes condition each tube to reproduce an image having a full brightness range, such potentials should, in addition, have such magnitudes relative to each other as will condition the brightnesses of the different color images not only to combine to reproduce a desired composite color image, but, more important, to combine over the brightness ranges of such color images to reproduce a black-and-white image. The present invention is particularly directed to circuits for simply and quickly adjusting the magnitudes of these biasing potentials to obtain the proper relative magnitudes thereof in a manner now to be more fully explained.

A signal representative of a dark shade of gray, being nearly black, is applied to the cathodes in each of the electron guns. The biasing potentials applied to the control electrodes of the guns R, G, and B are then adjusted, for example, by adjusting the potentials developed by the batteries 234R, 234G, and 234B, respectively. The adjustment of the potential applied to the control electrode in each electron gun is such as to cause a minimum of illumination to be reproduced on the image screens of the different tubes and to cause the illuminations from the three tubes to combine to reproduce the proper dark shade of gray as represented by the applied signal. This adjustment is conventional and establishes the proper black-level setting for the control electrodes of the three tubes.

After such adjustment has been made, in order to assure the reproduction of substantially a black-and-white image over the complete brightness range of such tubes, a further adjustment of other biasing potentials in such tubes is made to condition the images reproduced by such tubes to combine to reproduce a shade of gray at the extremity of the brightness range remote from black and when a monochrome signal representing an illumination which is substantially at the other extremity of the brightness range, for example, representing white is applied to such tubes. By thus adjusting the biasing potentials on the electrodes of such tubes to reproduce both black and white then, within the linearity limits of the reproducing apparatus, all shades between black and white will be reproduced. As a practical matter, due to nonlinearities in the tubes, the biasing potentials are adjusted to cause the aforementioned dark shade of gray to be reproduced and then a light shade of gray which may be only two-thirds or three-quarters along the brightness range to full white is used as the second reference. In this manner, any effects arising from the aforesaid nonlinearities will cause errors in one sense in the brightnesses between black and the dark shade of gray, errors in the opposite sense for brightnesses between the latter gray and the aforesaid light shade of gray and again in the one sense in the range between such light gray and white, thereby minimizing the average deviations from black and white in the reproduced images.

To adjust the relative magnitudes of the biasing potentials to condition the reproducing apparatus to reproduce the reference shade of gray, a signal representative of such shade of gray is applied to the cathodes of the three guns R, G, and B and the composite illumination reproduced by the combined illuminations from the three tubes is viewed. If such composite light is tinted by one of the three colors or by a pair of such colors, then an adjustment of the illuminations from the tubes reproducing such colors is indicated. For example, the composite light may have a greenish tint indicating that too much green is being combined with the red and blue illuminations to reproduce the composite light. The bias potential applied to the control electrode of the green gun G cannot be readjusted without destroying the initial black-level setting. Therefore, it is conventional to adjust the bias potential applied to the screen electrode of such gun to decrease the amount of green light so that the composite light is modified to be substantially the reference shade of gray. It should be understood that not only may the green illumination require modification but also the blue illumination may likewise require modification and such modifications may comprise either increasing or decreasing the brilliance of the green and blue lights so that the red, green, and blue lights will have the proper relative luminances to combine to develop the reference shade of gray. In addition, it should be understood that, since the adjustments are only relative adjustments and the bias potentials initially applied to the control and screen electrodes of the guns are adequate to provide a full range of brightnesses, controls for adjusting the biasing potentials on the screen electrodes to effect control of the relative illuminations need only be provided for two of the three tubes. At the present time, the development of red light is less efficient than that of green or blue lights due to the relative insensitiveness of the phosphor for developing red and, therefore, as described herein, the adjustments of the biasing potentials in the manner explained above are made only in the green and blue tubes. However, it should be understood that, if desired, similar adjustments could be made in the red gun.

As explained above, the screen-electrode potentials are controlled in one or more of the picture tubes to cause the proper relative illuminations emitted by the picture tubes to develop a composite illumination corresponding to that represented by the signal applied to the cathodes of such tubes, for example, the reference shade of gray. However, it is well known that, except for such tubes as are designed for constant-current amplification, an adjustment of the biasing potential on one electrode in a tube will effect the response characteristic of at least some of the other electrodes in such tube. Thus, the readjustment of the screen-electrode potential in the green electron gun G will disturb the initial black-level setting for the control electrode therein and, in conventional circuits as now employed, a readjustment of the control-electrode biasing potential will have to be made.

Figure 3A:
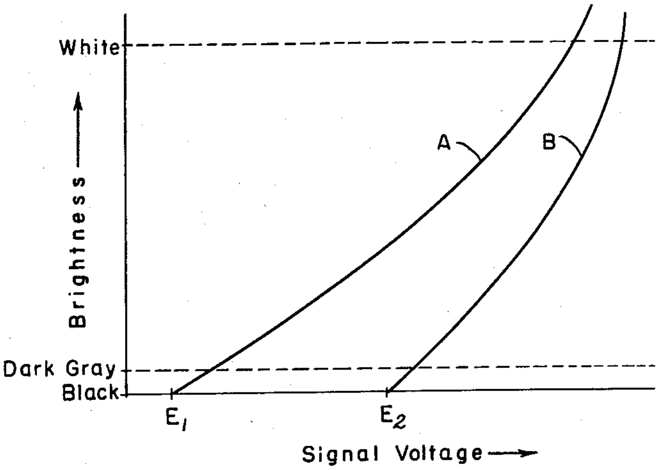

Reference to the curves of Fig. 3*a*, which are representative of the input signal-output brightness response of a conventional cathode-ray tube for different values of screen voltage, with assist in understanding how such black level is disturbed by changes in the screen voltage. Curve A represents one response for one magnitude of screen voltage. Such curve has a characteristic slope over the brightness range and, it is assumed, has a proper black-level cutoff potential of $E_1$ where such potential is that which represents black in the brightness signal. If, in order to obtain proper illumination from the cathode-ray tube for signals representing shades near white, the screen-electrode potential is changed so that the input signal-output brightness response curve for the new screen-electrode voltage is represented by curve B, then the control-electrode cutoff potential becomes $E_2$ and the black-level setting is in error by the difference between $E_2$ and $E_1$. Thus, a readjustment of the black level is required and such will disturb the modified screen-electrode potential.

In practice, with prior image-reproducing systems the adjustments and readjustments of the screen- and control-electrode potentials may be numerous. In other words, a number of these adjustments and readjustments might have to be made before a satisfactory compromise adjustment of the biasing potentials on the two electrodes could be obtained. To diminish the need for numerous such adjustments, applicant's improved image-reproducing system includes at least one control circuit which effectively interlocks the potentials on the control and screen electrodes of an electron gun so that normally only an initial adjustment of the control-electrode potential to obtain black level and a subsequent adjustment of the screen-electrode potential for the proper high-light illumination need be made to obtain complete adjustment of the operation of the tube over all brightness ranges. Such a control circuit may be included for each electron gun and comprises, for example, in the circuit coupled to the green gun the resistors 236G, 238G, and 240G.

Figure 3B:
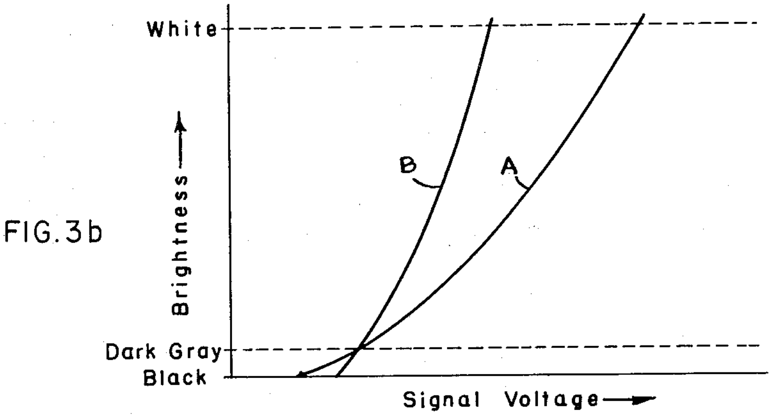

Prior to considering the details of the adjustments of the voltage dividers in the circuit of Fig. 2, it may be helpful to refer to Fig. 3*b* in order to understand the manner in which a black level is maintained even though the screen-electrode voltage is adjusted. The graph of Fig. 3*b* has the same coordinates as that of Fig. 3*a*. Curves A and B represent different responses of the cathode-ray tube for a range of voltages applied to the control electrode or cathode thereof, such responses being determined by the potential on the screen electrode. By means of the aforesaid control circuit, as the screen-electrode potential is adjusted from that which determines the response represented by curve A to that which determines the response represented by curve B in order to adjust for proper illumination for signals which represent shades near white, the black level established for a signal representing a dark gray remains constant. The manner in which this constancy is maintained will now be explained with reference to Fig. 2.

In the apparatus of Fig. 2, after the potentials on the control electrodes of the different guns have been adjusted to control the picture tube to develop a dark shade of gray when a signal representative of such shade is applied thereto, in other words, after the black level has been adjusted for all of the electron guns, a signal representative of the aforementioned light or reference shade of gray is applied to the cathodes of these guns and the potential on the screen electrode of one or more of such guns is adjusted by means of one or more of the voltage dividers 240G and 240B to cause the composite light from the picture tube to develop the reference shade of gray. In the apparatus of Fig. 2 the adjustment of, for example, the voltage divider 240G will control the amount of illumination from the green tube at high brightness levels without disturbing the initial black-level adjustment on the control electrode of the green gun because of two related factors. The first of these is the relationship of the magnitudes of the resistors 238G and 236G, resistor 238G having a magnitude of $\mu$ times that of the resistor 236G where the value of $\mu$ is that for low anode current through the green gun of the picture tube. The second of these factors is the fact that $\mu$ is variable over the brightness range and, therefore, for example, the resistors 236G and 238G do not have magnitudes in the ratio of that value which $\mu$ has for high anode currents or high brightness levels. A more detailed consideration of the manner in which the potentials on, for example, the control and screen electrodes of the green gun vary when the voltage divider 240G is adjusted may be helpful in understanding the above-mentioned operation.

Since the resistor 238G has a magnitude of $\mu$ times that of the resistor 236G, the potential developed across the former resistor due to the current flowing through the resistors 238G, 240G, and 236G is always $\mu$ times that developed across the resistor 236G by the same current. Thus, if $\mu$ was constant over the range of anode current, adjustment of the potential on the screen electrode by means of the voltage divider 240G would cause a compensating adjustment of the voltage on the control electrode and the effects of such adjustments on the anode current would be such as to cancel each other, thereby maintaining the anode current constant. However, as has been previously stated, $\mu$ is not constant but varies with the magnitude of the anode current and, thus, for high-current levels representing high brightness levels, the adjustment of the screen-electrode potential, though it causes a readjustment of the potential on the control electrode in the ratio of the $\mu$ for low brightness levels, is sufficient to modify the high-level anode current thereby to adjust the relatively bright illumination emitted by the tube by the desired amount without disturbing the black-level setting on the control electrode, in the manner represented by Fig. 3*b*. It may be helpful in understanding the above explanation if it is presented somewhat differently. At low anode-current levels where the magnitudes of the resistors 236G and 238G are in the ratio of the control electrode-screen electrode $\mu$ at such levels, the potential on the screen electrode can be varied over a wide range by adjustment of the magnitude of the resistor 240G without changing the magnitude of the current flowing in the green gun of the cathode-ray tube. However, at higher current levels where such $\mu$ has a different value, variation of the potential on the screen electrode does vary the current flowing in the green gun of the picture tube thereby permitting a modification of the green illumination from the picture tube at such higher brightness level.

Though the above explanation for purposes of brevity, simplicity, and ease of understanding has been presented in such manner as to relate primarily to the operation of the green gun, it should be understood that, in practice, where three electron guns are employed and thus three illuminations or images are developed which should have well-defined relative illuminations throughout the brightness range, the biasing potentials on the screen and control electrodes of two of such guns will probably require adjustment. That is, if there are red, green, and blue guns, the potentials on the aforementioned electrodes of one of such guns, for example, the red gun may remain unadjusted while those on the corresponding electrodes of the green and blue guns are adjusted in the manner explained herein to develop the proper relative illuminations of the three colors over the brightness range.

To summarize, referring to the apparatus 14 of Fig. 1, which includes a picture tube 31 having three electron guns, the voltage dividers 34R, 34G, and 34B are adjusted, in a conventional manner, to set the black-level potentials for the control electrodes of the red, green, and blue guns, respectively. The voltage dividers 36G and 36B are adjusted to cause the resistors 38G and 38B, respectively, to have magnitudes which are $\mu$ times those of the dividers 36G and 36B, respectively, where the value of $\mu$ is that for an anode current near cutoff. In practice, the vernier adjustment of, for example, the resistor 36G may be made by simultaneously varying the magnitude of the divider 40G while adjusting the divider 36G so that the variation in the magnitude of the element 40G resulting in a variation in the screen-electrode potential over a predetermined range does not substantially affect the black-level setting for the control electrode of this gun. Finally, in response to a signal representing the reference shade of gray, one or more of the voltage dividers 40G and 40B are adjusted to modify the screen-electrode potentials to control the relative illuminations from the three phosphors so that the lights emitted therefrom are in proper relative magnitudes to combine to develop a composite light which corresponds to the reference shade of gray. When such adjustments have been made, the picture tube 31 is conditioned to reproduce desirable color and black-and-white images.

While applicant does not intend to be limited to any particular circuit constants, in one embodiment of the invention in which the direct-current restorers and cathode circuits of the picture tube are conventional, the following circuit constants proved useful in practicing the present invention.

| | |
|---|---|
| Voltage divider 34R | 35 kilohms (max.). |
| Voltage dividers 34G, 34B | 27 kilohms (max.). |
| Voltage dividers 36G, 36B | 15 kilohms (max.). |
| Resistors 37R, 37G, 37B | 1 megohm. |
| Resistors 38G, 39G, 38B, 39B | 68 kilohms. |
| Voltage dividers 40G, 40B | 250 kilohms (max.). |
| Picture tube 31 | Type C–73597 (RCA). |
| Potential +B | 375 volts. |

Though the invention has been described with reference to a cathode-ray tube having three electron guns, it should be understood that it is not limited to such a tube. The teachings of the invention may broadly be utilized in an image-reproducing apparatus including a plurality of variable-mu tubes or electron-discharge devices to each of which there are applied signals representative of chromaticity and brightness for effecting combination of the signals developed in the output circuits thereof to reproduce primary color images which may be optically combined to reproduce either a composite color image or a black-and-white image. Such tubes may be an integral part of the picture tube or may be external thereto.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An image-reproducing system for a color-television receiver for reproducing either color or monochrome images having a range of brightnesses comprising: an input circuit for supplying a monochrome signal; a color image-reproducing apparatus including a plurality of electron guns each having at least two pairs of electrodes with an electrode common thereto, a first of said pairs in each of said guns being responsive to said monochrome signal for controlling said apparatus to develop and combine different color images to reproduce said monochrome images; biasing means including a source of biasing potential and comprising a first biasing circuit including a first impedance element coupled to said source and to one of said first pairs of electrodes in one of said guns for applying a biasing potential thereto and comprising a second biasing circuit including a second impedance element coupled to said source and to one of said second pair of electrodes in said one gun for applying a biasing potential thereto, said biasing potentials being so proportioned as to control said apparatus to reproduce a predetermined brightness level in the vicinity of one extremity of said brightness range when said monochrome signal represents said level; and an adjustable impedance means coupled between the uncommon ones of said electrodes in said one gun for controlling the current in said impedance elements to adjust the biasing potential on one of said uncommon electrodes to control said apparatus to reproduce a second brightness level in the vicinity of the other extremity of said brightness range when said monochrome signal represents said other level and simultaneously to adjust the bias potential of the other of said uncommon electrodes to compensate for the effect thereon of the adjustment of the potential on said one electrode.

2. An image-reproducing system for a color-television receiver for reproducing either color or monochrome images having a range of brightnesses comprising: an input circuit for supplying a monochrome signal; a color image-reproducing apparatus including a plurality of electron guns each having at least two pairs of electrodes with an electrode common thereto, a first of said pairs in each of said guns being responsive to said monochrome signal for controlling said apparatus to develop and combine different color images to reproduce said monochrome images; biasing means including a source of biasing potential and comprising a first biasing circuit including a first impedance element coupled to said source and to one of said first pairs of electrodes in one of said guns for applying a biasing potential thereto and comprising a second biasing circuit including a second impedance element coupled to said source and to one of said second pair of electrodes in said one gun for applying a biasing potential thereto, said biasing potentials being so proportioned as substantially to prevent any electron flow from said one gun when said monochrome signal represents substantially black; and an adjustable impedance means coupled between the uncommon ones of said electrodes in said one gun for controlling the current in said impedance elements to adjust the biasing potential on one of said uncommon electrodes to control said apparatus to reproduce substantially white when said monochrome signal represents white and simultaneously to adjust the bias potential of the other of said uncommon electrodes to compensate for the effect thereon of the adjustment of the potential on said one electrode.

3. An image-reproducing system for a color-television receiver for reproducing either color or monochrome images having a range of brightnesses comprising: an input circuit for supplying a monochrome signal; a color image-reproducing apparatus including a plurality of electron guns each having a control electrode-cathode circuit and a screen electrode-cathode circuit, said control electrode-cathode circuit in each of said guns being responsive to said monochrome signal for controlling said apparatus to develop and combine different color images to reproduce said monochrome images; biasing means including a source of biasing potential and comprising a first biasing circuit including a first impedance element coupled to said source and to the control electrode portion of said control electrode-cathode circuit in one of said guns for applying a biasing potential thereto and comprising a second biasing circuit including a second impedance element coupled to said source and to the screen electrode portion of the screen electrode-cathode circuit in said one gun for applying a biasing potential thereto, said biasing potentials being so proportioned as to control said apparatus to reproduce a predetermined brightness level in the vicinity of one extremity of said brightness range when said monochrome signal represents said level; and an adjustable impedance means coupled between said control-electrode and screen-electrode portions for controlling the current in said impedance elements to adjust the biasing potential in the screen electrode-cathode circuit of said one gun to control said apparatus to reproduce a second brightness level in the vicinity of the other extremity of said brightness range when said monochrome signal represents said other level and simultaneously to adjust the bias potential in the control electrode-cathode circuit of said one gun to compensate for the effect thereon of the adjustment of the potential in said screen electrode-cathode circuit.

4. An image-reproducing system for a color-television receiver for reproducing either color or monochrome images having a range of brightnesses comprising: an input circuit for supplying a monochrome signal; a color image-reproducing apparatus including a plurality of electron guns each having at least a control electrode, a screen electrode and a cathode, said cathode in each of said guns being responsive to said monochrome signal for controlling said apparatus to develop and combine different color images to reproduce said monochrome images; biasing means including a source of biasing potential and comprising a first biasing circuit including a first impedance element coupled to said source and to said control electrode in one of said guns for applying a biasing potential thereto and comprising a second biasing circuit including a second impedance element coupled to said source and to said screen electrode in said one gun for applying a biasing potential thereto, said biasing potentials being so proportioned as to control said apparatus to reproduce a predetermined brightness level in the vicinity of one extremity of said brightness range when said monochrome signal represents said level; and an adjustable impedance means coupled between said control and screen electrodes in said one gun for controlling the current in said impedance elements to adjust the biasing potential on said screen electrode to control said apparatus to reproduce a second brightness level in the vicinity of the other extremity of said brightness range when said monochrome signal represents said other level and simultaneously to adjust the bias potential of said control electrode in said one gun to compensate for the effect thereon of the adjustment of the potential on said last-mentioned screen electrode.

5. An image-reproducing system for a color-television receiver for reproducing either color or monochrome images having a range of brightnesses comprising: an input circuit for supplying a monochrome signal; a color image-reproducing apparatus including a plurality of electron guns each having at least two pairs of electrodes with an electrode common thereto, a first of said pairs in each of said guns being responsive to said monochrome signal for controlling said apparatus to develop and combine different color images to reproduce said monochrome images; biasing means including a source of biasing potential and comprising a first biasing circuit including a first impedance element coupled to said source and to one of said first pairs of electrodes in one of said guns for applying a biasing potential thereto and comprising a second biasing circuit including a second impedance element having an impedance substantially $\mu$ times the impedance of said first element, where $\mu$ is equal to the ratio of the increments in the potentials on the two pairs of electrodes in said one gun to cause equal increments in the current from said gun at currents in the vicinity of cutoff, and coupled to said source and to one of said second pair of electrodes in said one gun for applying a biasing potential thereto, said biasing potentials being so proportioned as to control said apparatus to reproduce a predetermined brightness level in the vicinity of one extremity of said brightness range when said monochrome signal represents said level; and an adjustable impedance means coupled between the uncommon ones of said electrodes in said one gun for controlling the current in said impedance elements to adjust the biasing potential on one of said uncommon electrodes to control said apparatus to reproduce a second brightness level in the vicinity of the other extremity of said brightness range when said monochrome signal represents said other level and simultaneously to adjust the bias potential of the other of said uncommon electrodes to compensate for the effect thereon of the adjustment of the potential on said one electrode.

6. An image-reproducing system for a color-television receiver for reproducing either color or monochrome images having a range of brightnesses comprising: an input circuit for supplying a monochrome signal; a color image-reproducing apparatus including a plurality of electron guns each having at least two pairs of electrodes with an electrode common thereto, a first of said pairs in each of said guns being responsive to said monochrome signal for controlling said apparatus to develop and combine different color images to reproduce said monochrome images; biasing means including a source of biasing potential and comprising a first biasing circuit including a first impedance element coupled to said source and to the uncommon electrode of one of said first pairs of electrodes in one of said guns for applying a biasing potential thereto and comprising a second biasing circuit including a second impedance element coupled to said source and to the uncommon electrode of said second pair of electrodes in said one gun for applying a biasing potential thereto, said biasing potentials being so proportioned as to control said apparatus to reproduce a predetermined brightness level in the vicinity of one extremity of said brightness range when said monochrome signal represents said level; and an adjustable impedance means coupled between the uncommon ones of said electrodes in said one gun for controlling the current in said impedance elements to adjust the biasing potential on one of said uncommon electrodes to control said apparatus to reproduce a second brightness level in the vicinity of the other extremity of said brightness range when said monochrome signal represents said other level and simultaneously to adjust the bias potential of the other of said uncommon electrodes to compensate for the effect thereon of the adjustment of the potential on said one electrode.

7. An image-reproducing system for a color-television receiver for reproducing either color or monochrome images having a range of brightnesses comprising: an input circuit for supplying a monochrome signal; a color image-reproducing apparatus including a plurality of electron guns each having at least two pairs of electrodes with an electrode common thereto, a first of said pairs in each of said guns being responsive to said monochrome signal for controlling said apparatus to develop and combine different color images to reproduce said monochrome images; biasing means including a source of biasing potential and comprising a first biasing circuit including a first resistor coupled to said source and to one of said first pairs of electrodes in one of said guns for applying a biasing potential thereto and comprising a second biasing circuit including a second resistor coupled to said source and to one of said second pair of electrodes in said one gun for applying a biasing potential thereto, said biasing potentials being so proportioned as to control said apparatus to reproduce a predetermined brightness level in the vicinity of one extremity of said brightness range when said monochrome signal represents said level; and an adjustable impedance means coupled between the uncommon ones of said electrodes in said one gun for controlling the current in said resistors to adjust the biasing potential on one of said uncommon electrodes to control said apparatus to reproduce a second brightness level in the vicinity of the other extremity of said brightness range when said monochrome signal represents said other level and simultaneously to adjust the bias potential of the other of said uncommon electrodes to compensate for the effect thereon of the adjustment of the potential on said one electrode.

8. An image-reproducing system for a color-television receiver for reproducing either color or monochrome images having a range of brightnesses comprising: an input circuit for supplying a monochrome signal; a color image-reproducing apparatus including a plurality of electron guns each having at least two pairs of electrodes with an electrode common thereto, a first of said pairs in each of said guns being responsive to said monochrome signal for controlling said apparatus to develop and combine different color images to reproduce said monochrome images; biasing means including a source of biasing potential and comprising a first biasing circuit including a first impedance element coupled to said source and to one of said first pairs of electrodes in one of said guns for applying a biasing potential thereto and comprising a second biasing circuit including a second impedance element coupled to said source and to one of said second pair of electrodes in said one gun for applying a biasing potential thereto, said biasing potentials being so proportioned as to control said apparatus to reproduce a predetermined brightness level in the vicinity of one extremity of said brightness range when said monochrome signal represents said level; and an adjustable resistor coupled between the uncommon ones of said electrodes in said one gun for controlling the current in said impedance elements to adjust the biasing potential on one of said uncommon electrodes to control said apparatus to reproduce a second brightness level in the vicinity of the other extremity of said brightness range when said monochrome signal represents said other level and simultaneously to adjust the bias potential of the other of said uncommon electrodes to compensate for the effect thereon of the adjustment of the potential on said one electrode.

9. An image-reproducing system for a color-television receiver for reproducing either color or monochrome images having a range of brightnesses comprising: an input circuit for supplying a monochrome signal; a color image-reproducing apparatus including a plurality of electron guns each having at least a control electrode, a screen electrode and a cathode, said cathode in each of said guns being responsive to said monochrome signal for controlling said apparatus to develop and combine different color images to reproduce said monochrome images; biasing means including a source of biasing potential and comprising a first biasing circuit including a first resistor coupled to said source and to said control electrode in one of said guns for applying a biasing potential thereto and comprising a second biasing circuit including a second resistor having a magnitude substantially $\mu$ times the magnitude of said first resistor, where $\mu$ is equal to the ratio of the increments in the potentials on said screen and control electrodes in said one gun to cause equal increments in the current from said gun at currents representative of a dark shade of gray, and coupled to said source and to said screen electrode in said one gun for applying a biasing potential thereto, said biasing potentials being so proportioned as to control said apparatus to reproduce a predetermined brightness level in the vicinity of one extremity of said brightness range when said monochrome signal represents said level; and an adjustable resistor coupled between said screen and control electrodes in said one gun for controlling the current in said first and second resistors to adjust the biasing potential on said screen electrode in said one gun to control said apparatus to reproduce a second brightness level in the vicinity of the other extremity of said brightness range when said monochrome signal represents said other level and simultaneously to adjust the bias potential on said control electrode in said one gun to compensate for the effect thereon of the adjustment of the potential on said last-mentioned screen electrode.

10. An image-reproducing system for a color-television receiver for reproducing either color or monochrome images having a range of brightnesses comprising: an input circuit for supplying a monochrome signal; a color image-reproducing apparatus including a plurality of electron guns each having at least two pairs of electrodes with an electrode common thereto, a first of said pairs in each of said guns being responsive to said monochrome signal for controlling said apparatus to develop and combine different color images to reproduce said monochrome images; a plurality of biasing means individually coupled to different ones of said guns and each comprising a source of biasing potential and a first biasing circuit including a first impedance element coupled to said source and to one of said first pairs of electrodes in one of said guns for applying a biasing potential thereto and each comprising a second biasing circuit including a second impedance element coupled to said source and to one of said second pair of electrodes in said one gun for applying a biasing potential thereto, said biasing potentials applied to said guns being so proportioned relative to each other as to control said apparatus to reproduce a predetermined brightness level in the vicinity of one extremity of said brightness range when said monochrome signal represents said level; and a plurality of adjustable impedance means individually coupled between the uncommon ones of said electrodes in different ones of said guns for controlling the current in said impedance elements to adjust the biasing potential on one of said uncommon electrodes in at least one of said guns to control said apparatus to reproduce a second brightness level in the vicinity of the other extremity of said brightness range when said monochrome signal represents said other level and simultaneously to adjust the bias potential of the other of said uncommon electrodes in said one gun to compensate for the effect thereon of the adjustment of the potential on said one electrode.

11. An image-reproducing system for a color-television receiver for reproducing either color or monochrome images having a range of brightnesses comprising: an input circuit for supplying a monochrome signal; a cathode-ray tube including three electron guns each having at least two pairs of electrodes with an electrode common thereto, a first of said pairs in each of said guns being responsive to said monochrome signal for controlling said apparatus to develop and combine different color images to reproduce said monochrome images; a pair of biasing means individually coupled to different ones of a pair of said guns and each comprising a source of biasing potential and a first biasing circuit including a first impedance element coupled to said source and to one of said first pairs of electrodes in one of said guns for applying a biasing potential thereto and each comprising a second biasing circuit including a second impedance element coupled to said source and to one of said second pair of electrodes in said one gun for applying a biasing potential thereto, said biasing potentials applied to said pair of guns being so proportioned relative to each other as to control said apparatus to reproduce a predetermined brightness level in the vicinity of one extremity of said brightness range when said monochrome signal represents said level; and a pair of adjustable impedance means individually coupled between the uncommon ones of said electrodes in said pair of guns for controlling the current in said impedance elements to adjust the biasing potential on one of said uncommon electrodes in each of said pair of guns to control said apparatus to reproduce a second brightness level in the vicinity of the other extremity of said brightness range when said monochrome signal represents said other level and simultaneously to adjust the bias potential of the other of said uncommon electrodes in each of said pair of guns to compensate for the effect thereon of the adjustment of the potential on said one electrode.

12. An image-reproducing system for a color-television receiver for reproducing either color or monochrome images having a range of brightnesses comprising: an input circuit for supplying a monochrome signal; a color image-reproducing apparatus including a plurality of electron-discharge devices each having at least two pairs of electrodes with an electrode common thereto, a first of said pairs in each of said devices being responsive to said monochrome signal for controlling said apparatus to develop and combine different color images to reproduce said monochrome images; biasing means including a source of biasing potential and comprising a first biasing circuit including a first impedance element coupled to said source and to one of said first pairs of electrodes in one of said devices for applying a biasing potential thereto and comprising a second biasing circuit including a second impedance element coupled to said source and to one of said second pair of electrodes in said one device for applying a biasing potential thereto, said biasing potentials being so proportioned as to control said apparatus to reproduce a predetermined brightness level in the vicinity of one extremity of said brightness range when said monochrome signal represents said level; and an adjustable impedance means coupled between the uncommon ones of said electrodes in said one device for controlling the current in said impedance elements to adjust the biasing potential on one of said uncommon electrodes to control said apparatus to reproduce a second brightness level in the vicinity of the other extremity of said brightness range when said monochrome signal represents said other level and simultaneously to adjust the bias potential of the other of said uncommon electrodes to compensate for the effect thereon of the adjustment of the potential on said one electrode.

References Cited in the file of this patent

UNITED STATES PATENTS

| | | |
|---|---|---|
| 2,607,845 | Clark | Aug. 19, 1952 |
| 2,621,244 | Landon | Dec. 9, 1952 |
| 2,627,547 | Bedford | Feb. 3, 1953 |